(No Model.) 2 Sheets—Sheet 1.

W. B. LUCE.
PHOTOGRAPHIC CAMERA.

No. 424,564. Patented Apr. 1, 1890.

Witnesses:
J. B. Upham
B. N. Upham

Inventor,
William B. Luce,
by A. B. Upham,
His Attorney.

(No Model.) 2 Sheets—Sheet 2.

W. B. LUCE.
PHOTOGRAPHIC CAMERA.

No. 424,564. Patented Apr. 1, 1890.

Witnesses:
J. B. Upham.
B. N. Upham.

Inventor,
William B. Luce,
by A. B. Upham,
His Attorney.

UNITED STATES PATENT OFFICE.

WILLIAM B. LUCE, OF BOSTON, MASSACHUSETTS, ASSIGNOR TO PERRY MASON & CO., OF SAME PLACE.

PHOTOGRAPHIC CAMERA.

SPECIFICATION forming part of Letters Patent No. 424,564, dated April 1, 1890.

Application filed July 29, 1889. Serial No. 319,027. (No model.)

*To all whom it may concern:*

Be it known that I, WILLIAM B. LUCE, a citizen of the United States, residing at Boston, county of Suffolk, State of Massachusetts, have invented a new and useful Improvement in Photographic Cameras, of which the following is a specification.

Figure 1:
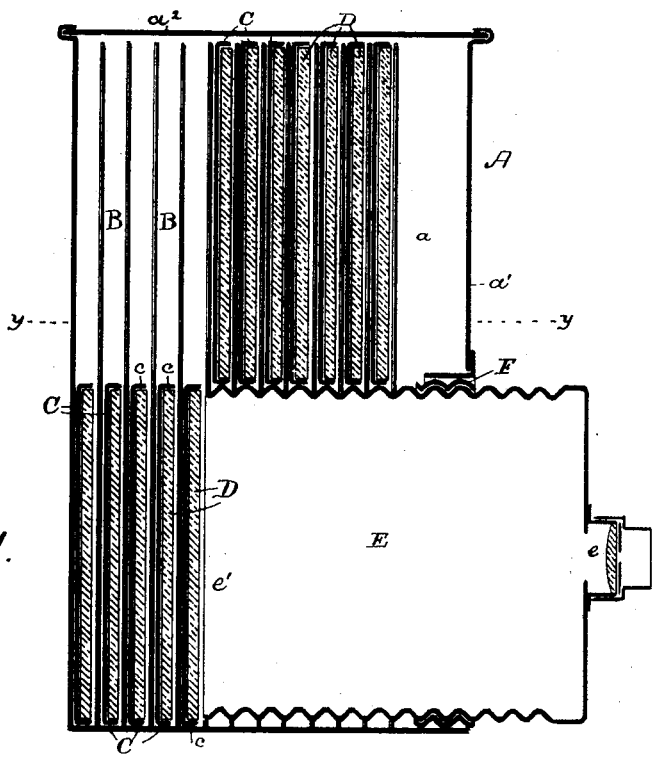
Figure 2:
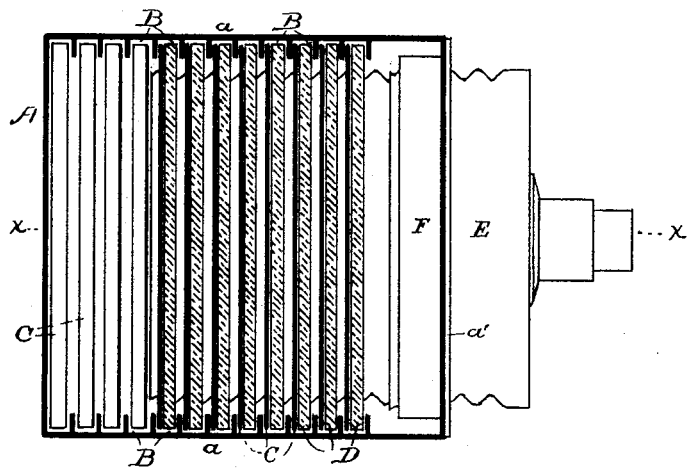
Figure 3:
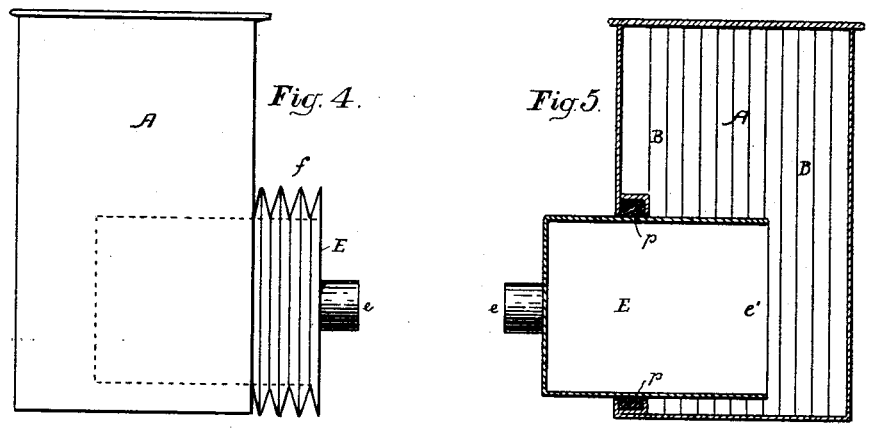
Figure 3:
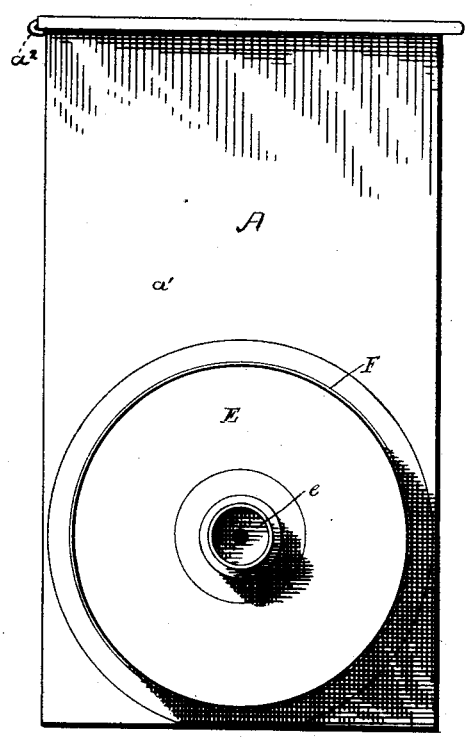

Referring to the drawings, Figure 1 is a vertical section of my camera through $x\ x$ in Fig. 2. Fig. 2 is a horizontal section through $y\ y$ in Fig. 1. Fig. 3 is a front elevation, and Figs. 4 and 5 are views of modifications of my camera.

The object of this invention is the construction of an improved photographic camera of the kind in which several sensitive plates can be placed at one time and pictures taken on each of them consecutively.

My invention consists, essentially, of a vertically-elongated camera-box having upright grooves, in which the plate-holders are loosely held, and an enlarged lens-tube open at its inner end and movable longitudinally in the lower part of the camera-box in such a manner as to support the plate-holders and permit them to drop one at a time into the field of the lens.

In the drawings, A is the camera-box having the vertical grooves B at the sides $a$. In these grooves the ends of the plate-holders C loosely fit, permitting the latter to be easily moved up and down. Through an aperture in the front $a'$ of the camera-box is inserted the lens-tube or lens-box E, which is of a depth from front to back approximately equal to the depth of the camera-box. The inner end of the lens-box E is open, while its exterior end is closed and provided with a lens $e$.

When the lens-box E is pushed entirely back into the camera-box, the plate-holders C rest upon its top or upper side; but when it is slowly withdrawn the plate-holders drop one by one to the open end $e'$, where, being in the field of the lens $e$, a picture can be taken upon the sensitive plate D carried by each plate-holder. The distance from the lens $e$ of the open end $e'$ is of course made equal to the focal length of the lens, and the plate-holders C are formed of some opaque material, so that there is no danger of fogging the first pictures when the succeeding ones are taken.

The plate-holders consist each of a square of sheet metal C, slightly less in length than the width of the camera-box A, and having a slight flange $c$ at its top and bottom edges. The sensitive plates are placed in these plate-holders when the latter are removed from the camera-box, for the reason that when inserted in the grooves B the plates and plate-holders are inseparable.

Among the several ways in which the lens-box E can be made, I prefer to form it cylindrical with a coarse screw-thread on its external surface engaging a nut F on the camera-box. In this way, the pitch of the threads being made equal to the width of the grooves B, each turn of the lens-box causes a plate-holder to fall into the field of the lens, exposing a fresh plate and shielding the preceding ones.

In Figs. 4 and 5 are shown other forms in which my camera can be constructed. In the form shown in Fig. 5 the lens-box E is smooth on its exterior surface and fits in a light tight packing $p$, while in the form indicated by Fig. 4 this packing is dispensed with, and a bellows-envelope $f$ is employed to prevent the leakage of light.

For the insertion and removal of the plate-holders and plates the top of the camera-box is provided with a suitable sliding cover $a^2$.

What I claim as my invention, and desire to secure by Letters Patent, is as follows, to wit:

1. The combination of the vertically-elongated camera-box having the upright grooves and the aperture in the lower part of its front, and the lens-box open at its inner end and longitudinally movable light-tight in said aperture, said parts being so arranged that when the lens-box is within the camera-box sensitive plates held in the grooves of the latter are supported by the lens-box, which as it is withdrawn permits the said plates to drop one by one into the field of the lens carried by the lens-box, substantially as and for the purpose specified.

2. The camera-box having the vertical grooves and apertured front, said aperture being circular and internally threaded, in combination with the cylindrical threaded lens-box removable in said aperture, substantially as and for the purpose specified.

In testimony that I claim the foregoing invention I have hereunto set my hand and seal this 24th day of May, in the year 1889.

WILLIAM B. LUCE. [L. S.]

Witnesses:
DANL. A. CASEY,
B. N. UPHAM.